(12) United States Patent
Jacobs et al.

(10) Patent No.: US 7,219,327 B1
(45) Date of Patent: May 15, 2007

(54) EXTENSIBLE DATA MODEL FOR USE IN AN INTEGRATED PLATFORM FOR CREATING A DISTRIBUTION MULTIAPPLICATION ONLINE PRESENCE

(75) Inventors: Joshua A. Jacobs, San Francisco, CA (US); John F. Shiple, San Francisco, CA (US); Christopher R. Miller, Oakland, CA (US); Mahesh Tyagarajan, San Jose, CA (US); Kirt David Johnson, Pacifica, CA (US); Bernard Luke Gallagher, San Francisco, CA (US); Chris Kiernan, San Francisco, CA (US)

(73) Assignee: Affinity Internet, Inc., Ft. Lauderdale, FL (US)

( * ) Notice: Subject to any disclaimer, the term of this patent is extended or adjusted under 35 U.S.C. 154(b) by 1049 days.

(21) Appl. No.: 09/603,467

(22) Filed: Jun. 22, 2000

Related U.S. Application Data

(60) Provisional application No. 60/142,181, filed on Jul. 1, 1999.

(51) Int. Cl.
*G06F 9/44* (2006.01)
(52) U.S. Cl. ............... 717/104; 717/107; 717/108
(58) Field of Classification Search ........ 717/101–119, 717/147
See application file for complete search history.

(56) References Cited

U.S. PATENT DOCUMENTS 4,742,467 A * 5/1988 Messerich et al. .......... 717/114
5,960,200 A * 9/1999 Eager et al. ................ 717/147
6,047,280 A * 4/2000 Ashby et al. ................ 707/2
6,269,474 B1 * 7/2001 Price ......................... 717/104
6,442,748 B1 * 8/2002 Bowman-Amuah ......... 717/108
6,480,860 B1 * 11/2002 Monday ..................... 707/102
6,536,037 B1 * 3/2003 Guheen et al. ............. 717/151

OTHER PUBLICATIONS

Hammer et al., "The Semantic Data Model: A Modeling Mechanism for Data base Applications", Proceedings of 1978 ACM SIGMOD International Conference on Mangement of Data, pp. 26-36, May 1978.*
IEEE Computer Society, "Bulletin of the Technical Committee on Data Engineering", IEEE Computer Society, vol. 22, No. 3, pp. 1-54, Jul. 1999.*

* cited by examiner

*Primary Examiner*—Ted T. Vo
(74) *Attorney, Agent, or Firm*—Beyer Weaver LLP

(57) ABSTRACT

Data constructs and architectures are disclosed for providing a foundation for an application-building system for enabling a non-technical user to perform discrete tasks to build a complete network-based application and maintain the same user experience throughout the application development. A data model having an extensible underlying structure that can be used in a user-oriented application development system having a task-based architecture is defined. The data model is capable of allowing for extensible attributes such that the addition of a new data attribute can be made without changing the underlying structure of the data model. Multiple applications making up the user-oriented application development system can access data from the data model. Data stored in a database having the data model as an underlying structure can be reused by the task-based architecture for various applications.

16 Claims, 14 Drawing Sheets

EXTENSIBLE DATA MODEL FOR USE IN AN INTEGRATED PLATFORM FOR CREATING A DISTRIBUTION MULTIAPPLICATION ONLINE PRESENCE

CROSS-REFERENCE TO RELATED APPLICATIONS

The present application claims priority from U.S. Provisional Patent Application No. 60/142,181, filed Jul. 1, 1999, the entirety of which is incorporated herein by reference for all purposes. The present application also relates to commonly assigned, copending U.S. patent application Ser. No. 09/602,576, concurrently filed herewith, for AN INTEGRATED PLATFORM FOR DEVELOPING AND MAINTAINING A DISTRIBUTED MULTIAPPLICATION ONLINE PRESENCE, the disclosure of which is incorporated herein by reference in its entirety for all purposes.

BACKGROUND OF THE INVENTION

1. Field of the Invention

The present invention relates generally to computer network-based application programming, design, and maintenance. More specifically, it relates to data constructs and methodologies for creating online, multiuser applications based on a single, uniform data model.

2. Discussion of Related Art

As the Internet and the World Wide Web grow and attract more and more viewers and content-providers, there has been a trend towards customization and, more broadly, user-empowerment. This movement in the online arena, whether on the Internet or an enterprise-based network, is marked by enabling users to create, customize and maintain their own presence on the network. One example of this is the proliferation of customized Web home pages for individuals that contain only information of specific interest to an individual and that can be edited by that individual. A broader example of user-empowerment is giving an online user or entity the ability to create a full-scale, customized Web site. Although users, primarily businesses, have been creating their own Web sites for years, not surprisingly, they have done so by hiring consultants and Web developers to do the work for them. However, as online application development reaches new levels, many of the initial technological and financial barriers are breaking down.

There are now available to online users several tools and wizard programs that allow them to build their own online applications, almost entirely without the help of Internet programmers or Web-site developers. A wizard is a set of steps (presented as separate screens/panels) that automate a task by asking users questions (with between one and ten questions per screen/panel). Many users now create their own home pages or complete Web sites using software from various vendors, such as popular software from Symantec Software Corporation and Microsoft Corporation, to name just two. Another trend that will inevitably grow more in the future is entities, typically commercial entities, building their own Web site to conduct online business or electronic commerce ("e-commerce"). Presently, there are providers that enable these entities to build their own commercial Web site, but there are still a number of drawbacks.

While advances in online application development have allowed users to create their own Web sites, little attention has been given thus far to forming a comprehensive, integrated, or complete solution and to providing a uniform user experience. E-commerce or e-business sites have increased dramatically in complexity, adding functionality such integration with customer databases, inventory management, and supply-chain management. Presently, no solution provides a platform for the continual advancement and integration of new e-business capabilities into a single framework with common data and user experience. In other words, no single package or toolkit currently available gives a user the ability to create a fully functioning commercially-enabled Web site. Nor do the toolkits provide a uniform user interface or, more broadly, user experience with which the user can become familiar and efficient.

The numerous services needed to build a complete online presence have disparate user experiences, thereby preventing any significant leveraging of skills users gain from a consistent user interface. Presently, users must register with each of the different Web sites where each site provides a different feature or function needed for the user's online presence. For example, a user may use a catalog building application tool from one provider and have to use a reporting or marketing tool from another provider, and then have to address communication between these and other components of the Web site. In another example, a user has to use several different programs such as a Web page development program, a graphics program, a database program, put them together, and then load it up to an ISP. Lack of uniformity in the user experience and the need to go to different providers are major barriers to entities building and maintaining their own online presence.

Although various application development models exist, none are entirely well-suited for enabling an entity to build its own "industrial-strength" network-based application, such as a comprehensive and commercially-enabled Web site. One such model can be referred to as a unified data model or "whiteboards" developed originally at MIT. This model used software agents to gather data and was used for single-application and multiple users. Many applications developed for online use are inherently multi-application (e.g., creating a catalog, reporting, site-building, etc.). Another application development model was used with the Newton hand-held digital organizer developed by Apple Computer Corp. The tool developed for the Newton enabled the execution of multiple applications but was geared for a single-user space. Naturally, any single-user model is not well suited for online application development. Furthermore, neither model supported a distributed architecture in which various components of the application reside at different places on the network.

Therefore, it would be desirable to have an integrated platform having a reactive architecture that allows a user to create a distributed, online application that can perform as a complete solution to a goal or problem. The platform should provide for single registration and have a seamless, uniform user experience that fosters leveraging skills learned from previous sessions. It would also be desirable for the platform to be distributed, and be multi-user and multi-application. Furthermore, it would be desirable for the architecture to be task-based and to provide for a uniform expression of data, which can be shared and is extensible.

SUMMARY OF THE INVENTION

To achieve the foregoing, data constructs, models, and architectures are disclosed which provide a foundation for an application-building system for enabling a non-technical user to perform discrete tasks to build a complete network-based application and maintain the same user experience throughout the application development. For example, the architectures and data constructs can be used to construct and maintain an Internet or online presence capable of handling e-commerce transactions or build a customer relationship management system.

In another aspect of the invention, a data model having an extensible underlying structure that can be used in a user-oriented application development system having a task-based architecture is defined. The data model is capable of allowing for extensible attributes such that the addition of a new data attribute can be made without changing the underlying structure of the data model. Multiple applications making up the user-oriented application development system can access data from the data model. Data stored in a database having the data model as an underlying structure can be reused by the task-based architecture for various applications.

In one embodiment, the data model is capable of abstracting data and aggregating or collecting data over an integrated common platform in a way that allows the data to be authored and distributed. In another embodiment, the data model performs as a uniform and shared data source for all users containing domain-specific data such that each user can leverage the shared data source.

In one aspect of the present invention, a data model having a structure for dynamically configuring and sharing existing application data from multiple systems is described. The data model contains a central or hub system containing a unique identifier. The hub system is accessible by the other systems using the unique identifier. The data model includes a first set of multiple data objects containing application data for managing tasks and a uniform user interface for creating an application. A data object has fixed attributes and extensible attributes. A second set of data objects representing an additional system is dynamically added to the data model and done so without altering the structure of the data model. The additional system can share existing application data with the hub system and the first set of data objects using the unique identifier.

In one embodiment the data model includes a first set of multiple model objects for containing the first set of multiple data objects. The model objects include a data input means and verification methods for verifying the application data. The model objects contains dependency logic for operating on the first set of data objects. In another embodiment additional application data is added to the data model and dynamically configured as one or more tasks are completed. In yet another embodiment, the data model has an Extensible Markup Language (XML) layer thereby allowing for extension of data objects.

In another aspect of the present invention, an extensible model object for containing and manipulating application data in a data model is described. The extensible model object contains one or more data objects for persistently storing application data relating to the model object where the application data includes fixed attributes and extensible attributes. The model object also includes a data manipulation logic component for manipulating the application data in the one or more data objects, where the model object is a logical interface between an application-building system and an end-user. The extensible attributes of a data object can include previously undefined attributes that are specific to an application.

In yet another aspect of the present invention, an application-building software architecture for enabling multiple users and multiple services to use a data model having a framework via a wide area network is described. The platform enables a user to extend the data model by adding a previously undefined data type in a dynamic way without having to alter the framework of the data model. In addition, the multiple services can use the previously undefined data type and another user can use an extension to the data model created by the first user.

BRIEF DESCRIPTION OF THE DRAWINGS

The invention will be better understood by reference to the following description taken in conjunction with the accompanying drawings in which.

DETAILED DESCRIPTION

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

The present invention describes a platform and data model that allows non-technical users to develop online and network-based applications. The platform can be viewed as an operating system which facilitates self-development of online and stand-alone applications. The data model component, which can also be viewed as a component of the platform, allows for the collection, aggregation, and modeling of user data which leads to efficient utilization and scaling of the data, such that the data can be shared across a high volume of users. The aggregated data, typically from many users, creates a data source which can be shared and leveraged by all the users. The data component or model is also robust in that it is easily extensible, flexible, and uniform.

The data model provides a foundation for an integrated platform on which a task-based architecture and methodology is implemented. This task-based architecture and methodology for building applications facilitates using a large data pool based on the data model. The data model and task-based architecture also allow for a uniform user experience, as well as other advantages described below. Similar to a conventional operating system, in order for the integrated platform to function, numerous applications and tools are needed. These applications and tools allow a user to use the data model and the task-based architecture to create a comprehensive, multiuser, online application, such as an e-commerce Web site, a catalog or portfolio-oriented Web site (for service-based online businesses), a customer relationship management application which allows a user to manage various types of customer relationships online, marketing and related business-acquisition tools, and different types of customer communication applications. In these types of multiuser, online applications, the user is typically an online merchant or small business owner ("SBO") desiring an online presence.

Figure 1:
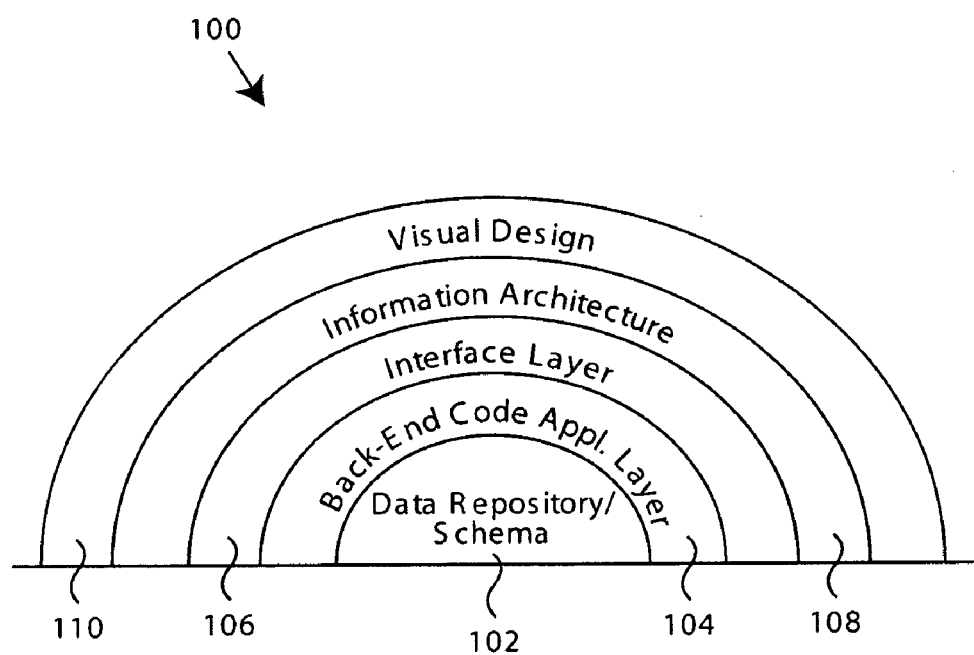
FIG. 1 is an illustration showing numerous layers of the platform in accordance with one embodiment of the present invention.
Figure 3:
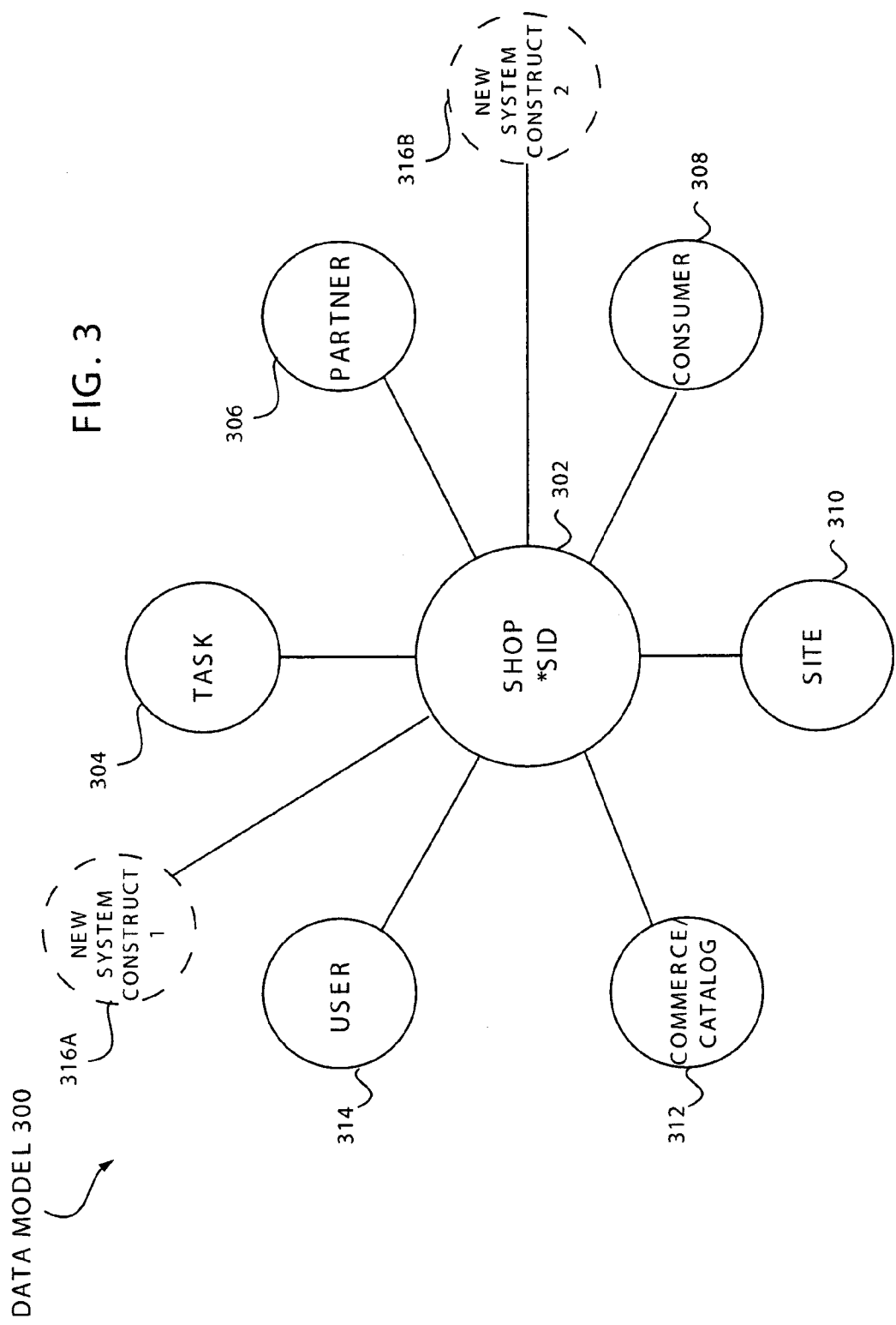
FIG. 3 is an illustration of a data model for an e-commerce enabled Web site in accordance with one embodiment of the present invention.
Figure 4:
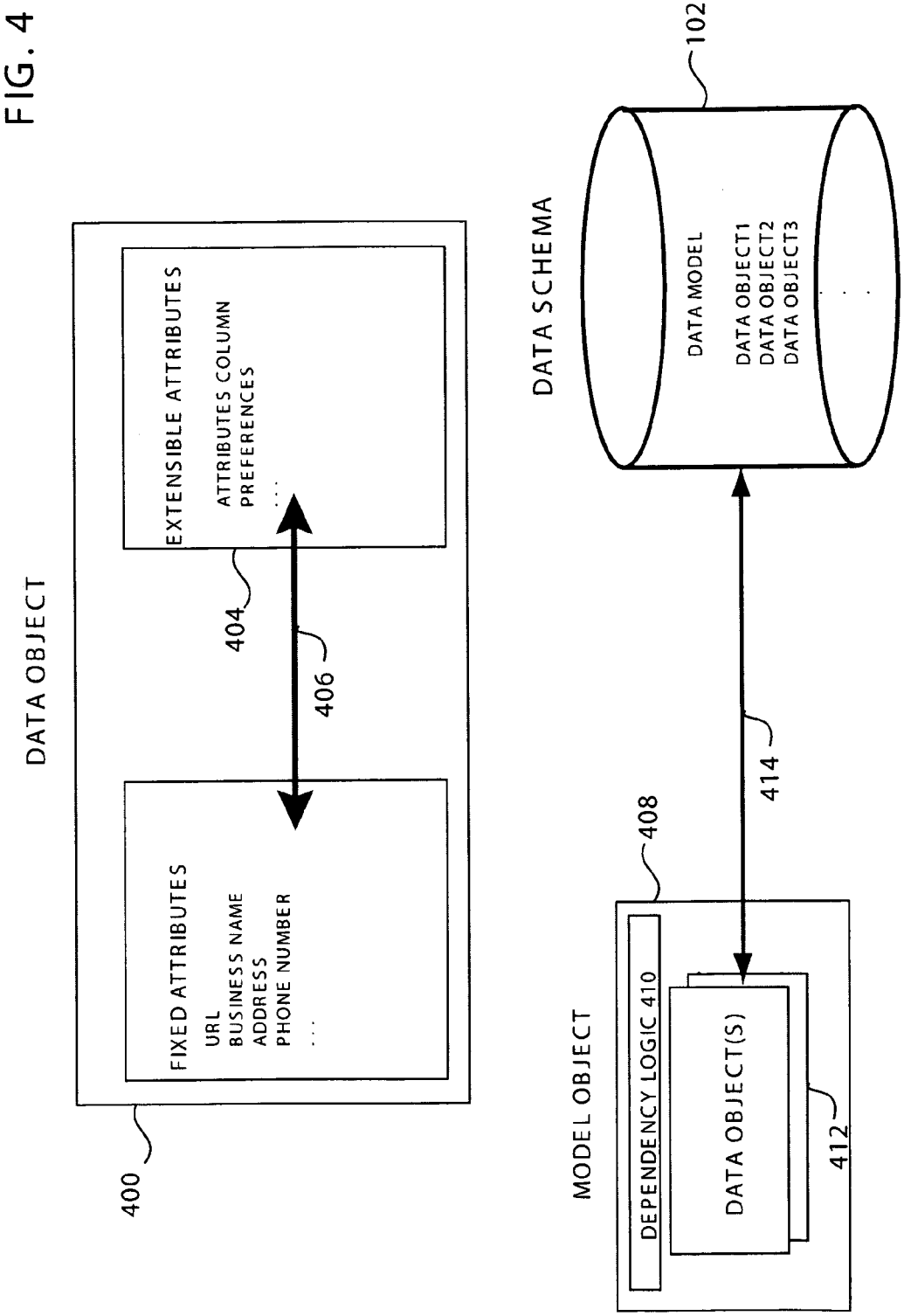
FIG. 4 is a block diagram of a data object, a model object, and a data schema in accordance with one embodiment of the present invention.

The integrated platform of the present invention can be described generally as a series of layers, again, much like an operating system. FIG. 1 is an illustration showing numerous layers of an integrated platform in accordance with one embodiment of the present invention. At the bottom of a platform 100 is a core data repository or data schema 102 which physically stores data for a one or more data models. A data model, described in greater detail in FIGS. 3 and 4, represents an arrangement or configuration of data in terms of fixed and extensible attributes as well as logic for operating on the data. For purposes of illustrating the described embodiment, data arranged in the data model can be, for example, business data and data relating to users, where a user is an SBO or online merchant. The data model has a unique configuration that facilitates the collection and aggregation of data and the addition of previously undefined data attributes, referred to as extensibility. Data schema 102 physically stores the data used by the applications, tools, and functions in conjunction with the task-based architecture. Data schema 102 can store data in the form of a relational database, flat files, a multidimensional database, or any other appropriate data storage schema.

Immediately above data schema 102 is a back-end code application layer 104. In the described embodiment, application layer 104 contains numerous application modules and programs that run behind the scenes of the user experience; that is, what the user sees and does when using the integrated platform. Above back-end code application layer 104 is an interface layer 106 which is the first layer of the system front-end. In the described embodiment, the front-end, consisting of interface layer 106, an information architecture layer 108, and a visual design layer 110, is loosely tied to back-end code application layer 104. Interface layer 106 provides a container mechanism, usually implemented as an HTML form element, which wraps data for transfer between application layer 104 and interface layer 106. Interface layer 106 connects layer 104 with an information architecture layer 108 and a visual design layer 110.

Information architecture layer 108 maps a user's "mental model," i.e., the user's knowledge domain, to data repository 102. Layer 108 also maps the user's mental model of a task-based interface to interface layer 106 and application layer 104. Information architecture layer 108 models the user experience and embodies a task-based architecture by implementing and reinforcing various models and flows for each task within the system, described below.

Interface layer 106 and application layer 104 translate the instructions provided by information architecture layer 108 and present the desired screens/panels to the user. Through this process, the technicalities and expertise normally needed to complete otherwise highly technical tasks are abstracted away. A visual design layer 110 rests on top of information architecture layer 108 and implements a user experience by presenting the actual interface that the user uses to enter data into the system. Visual design layer 110 implements the user interface for the task-based architecture.

Layers of integrated platform 100 that are part of the task-based architecture and, thus, particularly relevant are information architecture layer 108, back-end code application layer 104, and data schema 102, or, more specifically, the data model embodied in data schema 102. A more detailed view of the last two layers is shown in FIG. 2.

Figure 2:
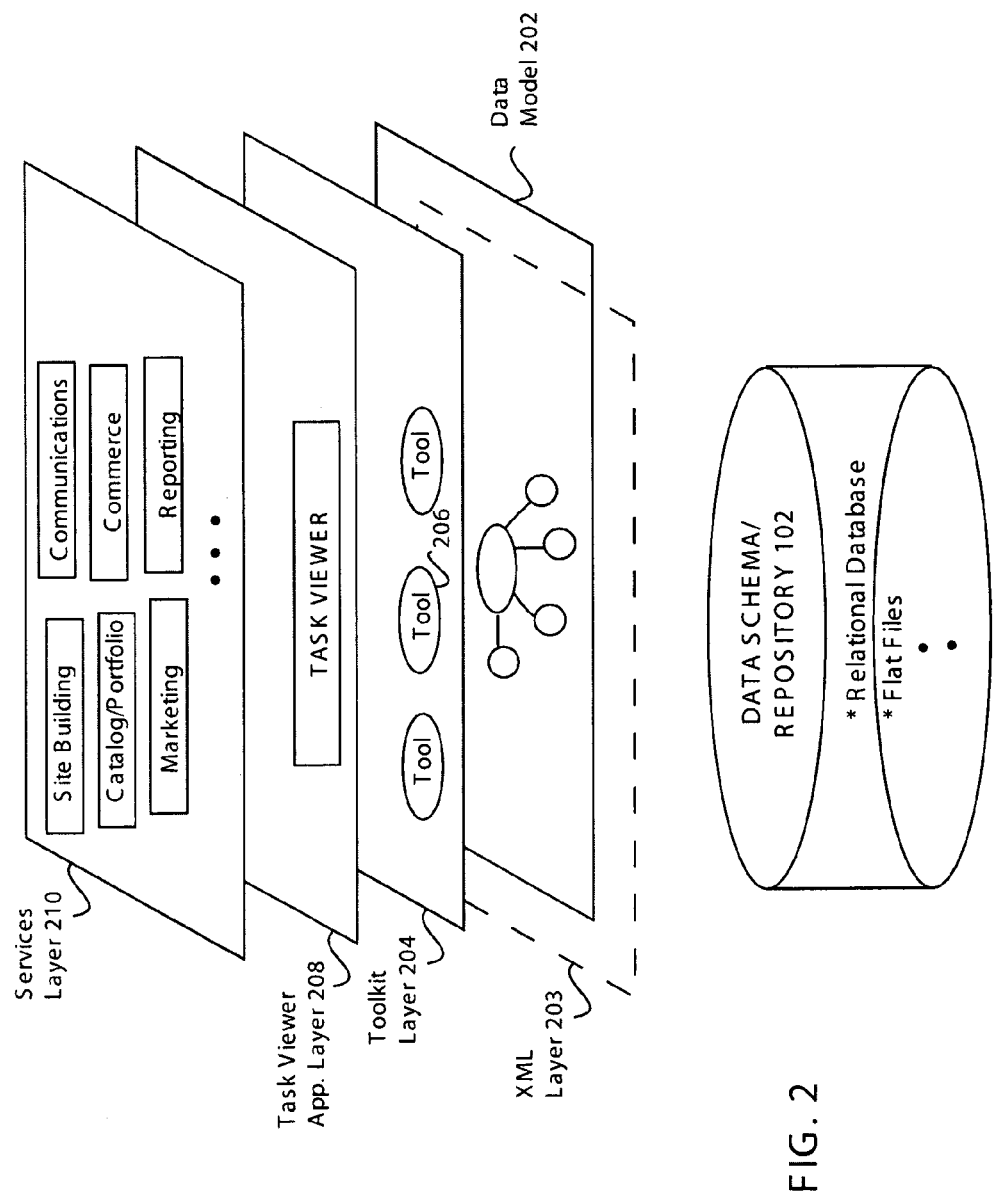
FIG. 2 is an illustration of components in a task-based architecture of an integrated platform in accordance with one embodiment of the present invention.

FIG. 2 is an illustration of components in a task-based architecture of an integrated platform in accordance with one embodiment of the present invention. At the bottom is data schema 102 which physically stores the data. Operating on data schema 102 is a data model 202 that configures and handles data stored in data schema 102. As mentioned above, a data model facilitates collecting, storing, and sharing information from a user. The data are modeled in such a way that they allow for efficient reuse of data already entered, in a way that is intuitive to and expected by the user. Data arranged in data model 202 are dynamically configured as the user completes various tasks. Data are expressed uniformly and can be shared by disparate and newly added applications and modules in the system. In the described embodiment, data model 202 has an Extensible Markup Language (XML) layer 203 that further facilitates the flexibility of data model 202 and its ability to collect and output data in a distributed manner. Thus, data model 202 allows for the abstraction, aggregation, and modeling of data in a common integrated platform and enables the task-based architecture of the present invention. Data model 202 is described in greater detail in FIG. 3.

In direct communication with data model 202 is a toolkit layer 204 containing numerous toolkits 206. Toolkits 206 are modules, systems, and frameworks that perform core functions of the application-building system of the present invention. The toolkits necessary for implementing the task-based architecture of the integrated platform are described in FIG. 8.

Operating in conjunction with toolkit layer 204 is a task viewer application layer 208. The application-building system of the present invention can be implemented by a service provider who manages the integrated platform, the data model, data repository, and other components of the system. The application-building system is a collection of database-driven applications. One such application is a task viewer application. A task viewer implements an interface for users to create relevant data, such as business data for an SBO. The task viewer provides a core set of services enabling a uniform user experience. These services include the delivery of sequential forms and screens for gathering and formatting information, information validation, and information storing services. The primary responsibility of the task viewer is the delivery of an atomic data gathering procedures. In order to provide flexibility in authoring data, these procedures have been partitioned into three discrete types of objects: tasks, sequences, and panels, each with their own function, described in FIG. 5. The task viewer application operates as a programmable wizard framework. In order to take advantage of the extensible data model of the described embodiment, an authoring system allows data objects in the data model to be created, extended, and stored by the system.

A services layer 210 can be considered part of interface layer 106 and the front-end of the application-building system. In the described embodiment, there are various services 212 that allow a user to create a complete, multiuser application without having to use any external programs or services. As mentioned above, one such multiuser application is creating a comprehensive e-commerce Web site for a user who wants an online presence. In such an application, services 212 refer to defined functions typically needed in order to fully complete the application. In the customized e-commerce Web site application of the described embodiment, the following broadly defined services are typically needed: 1) site building; 2) communication; 3) catalog or portfolio; 4) commerce; 5) marketing; and 6) reporting. In another preferred embodiment, a Web site-building application can have more or fewer services as the needs of Web sites can vary over time. In yet another preferred embodiment, services of a different nature or type can be used for a different application, such as a customer marketing campaign.

FIG. 3 is an illustration of a data model for an e-commerce enabled Web site in accordance with one embodiment of the present invention. At the center of a data model 300 is a shop system 302. Shop system 302, as with other systems described below, is a collection of model objects. Shop 302 contains a unique sequence identifier ("SID") used for identifying a user. The SID is used by other systems to key into shop 302. When a user logs in, the user's SID is retrieved and used to pull in the rest of the data from the other systems for that user. Each of the systems can get to shop using the user's SID. Shop 302 is the key to getting data from the other systems.

A task management system 304 is a wizard framework for handling all user interaction through tasks, sequences, and panels. These specific components are described below. Task management system 304 is responsible for presenting a standard, seamless, user interface to a user for all data creation and editing functions. It allows for tracking and resuming tasks when a user stops working on a task before the task is completed. It is also responsible for the identification, verification, and publication of all data it receives from a user through panels.

A partner system 306 is used primarily by the application-building service provider and not the user. It allows the service provider to partner with third-parties through which users choose to build their applications. Partner system 306 is an aggregator of objects that relate to aspects of the application-building service that can be modified according to a particular partner. It is an extensible mechanism for providing business term-specific overrides to the integrated platform at runtime. For example, it contains models objects and data objects that control aspects of the user experience, such as color, fonts, and partner logos, that can be customized for a particular partner of the service provider. Thus, these implementation-specific variables can change depending on the partner and are modeled and loaded into the environment by partner system 306. This is done without assistance from or effecting the other components or systems in the platform.

A consumer system 308 maintains a database of end-users somehow associated with the user, such as a list of visitors and customers to an SBO Web site. This list or database is fully integrated and addressable from other systems in data model 300 using the user's SID. A site management system 310 encapsulates data relating to a user's Web site. A user can have multiple sites, such as one that is being created and is previewed only by the user and another that is published and viewable by the public. A commerce/catalog system 312 is a catalog database attached to a user through shop 302, similar to the database in consumer system 308. A typical catalog database contains descriptions and prices of products and services available from the user. Additionally, this system is responsible for recording all commerce transaction associated with the shop. This includes an order management and processing function which is tied to consumer system 308. A user management system 314 performs general user authentication and checks roles and permission levels within the system. For example, a user, such as an SBO, may have several employees who can access the application-building service, some of whom can perform only certain tasks, such as creating a map page, but not others, such as establishing a merchant account. User management system 314 controls access of users in the system.

Also shown in data model 300 are new system or application constructs 316A and 316B. These constructs show that new systems and applications can be added to data model 300 dynamically without effecting existing systems. As long as new systems 316A and 316B can be accessed using a user's SID, the platform can be extended to include them. This can be done by creating additional model objects and data objects, described in FIG. 4, and without altering the structure of the underlying data schema. In addition, new systems 316A and 316B can use data from the other systems described above.

FIG. 4 is a block diagram of a data object, a model object, and a data schema in accordance with one embodiment of the present invention. A data object 400 is used for efficient persistent storage and is capable of reading from and writing to data schema 102 but is not capable of performing any logical operations on the data. In the described embodiment, data object 400 has two components: fixed attributes 402 and extensible attributes 404. Fixed attributes 402 represent items known to the user at the time the data object is created and may include data items such as a URL or Web address, a user name, address, and other basic data. Some data items can be divided into subcomponents. For example, phone number can be stored as several components: country code, suffix, prefix, area code, and so on.

Extensible attributes 404 include data that are user-specific or are added to the user system at a later time or cannot be defined in fixed attributes 402. Extensible attributes 404 can include user-specific preferences, such as performing a task in beginner or advanced mode, or hiding or showing a summary area for a task. Another example of extensible attributes is "Frequently Asked Questions" or FAQs data for an SBO which are typically very business specific and, therefore, ideal for being stored as extensible attributes in a data object. Arrow 406 represents that data of either attribute can be shared, or can be converted from one type to another when allowed by the system.

Using an example of an e-commerce enabled Web site, an SBO or online merchant can be represented as a collection of data objects 400. These data can be further reduced into categories that represent, at a high level, components of the business. To illustrate, business data can generally be categorized into four areas: business information (e.g., hours of operation, location, name, tax information, etc.), a catalog of good and/or services which the business offers, a collection of customers and their related attributes (e.g., name, contact information, profile information, billing, etc.) and financial data such as income and operating costs. The information is collected via applications in these categories and is utilized to deploy a core set of user applications that rely on this data for functionality. Information is entered, exchanged, and reused among components in a multiuser application. The e-commerce Web site is described as a collection of data. The model for this data can be populated by many applications. Examples of multiuser applications include the creation of Web pages, management of a complex Web site, construction of online catalogs or portfolios, as well as online order processing functionality, and e-commerce transactions.

In order to manage information related to these categories, the data are data. These objects are referred to as model objects. A model object 408 is a containment structure for data objects through which all interaction between applications and the data schema occurs. It contains business intelligence in the form of dependency logic 410 for one or more related data objects 412. Dependency logic 410 understands the relationship between data objects 412 and knows what needs to be done when certain data are modified. In a simple example, when a user changes a Web address, at the data object level, a URL field in fixed attributes component 402 is written to with the new address. However, data object 400 does not know that an external DNS server needs to be notified. Model object 408, and specifically, dependency logic 410, understands that the DNS server needs to be notified and that there needs to be a storage change in the data schema, and causes these events to occur.

Data schema 102 is the physical storage of data model 202 which, in turn, is a collection of data objects. An API 414 between model object 408 and data schema 102 allows for modification of the data. API 414 is determined by the type of physical data storage mechanism used, such as a relational database or a multidimensional database.

Besides being a container of data objects, model object 408 provides a user with a standardized interface for manipulating attributes in data objects 412. Users do not need an external understanding of the data objects' interdependencies or how the data are configured and stored. In sum, the model object can be seen as a type of logical interface between the application-building system and the user, and the data objects, as contained in model objects, as a type of database interface. In the described embodiment, model objects and data objects are implemented by encapsulating them using Java™ bean technology as is known in the field of Internet and network-based application programming.

In order for the integrated platform to process the disparity among different types of business or non-business data, the platform requires a mechanism for extending the attributes of a given model object. As mentioned above, in the described embodiment, XML is used to implement data and logic for the model objects and data objects. As is known in the field of Internet application programming, XML allows for arbitrary attributes to be structured in a hierarchical format. This hierarchical format enforces structure and dependency while allowing for changes that do not affect external clients or users of the contained data. Thus, data object 400 exposes its data to model object 408 via an XML layer (shown as XML layer 203 of FIG. 2) thereby allowing for attributes to be added as desired, i.e., making them extensible. Model objects can be extended as new relationships form which require enforcement of data dependencies.

The interaction between a model object and data object can be illustrated by taking the example of a model object that acts on a relationship between an SBO and an online customer. The model object in this case enforces a dependency binding a data object to a business entity. Extensible attributes of such a data object may begin with data relating to when the relationship was established, how the customer was referred to the SBO online site, and whether a transaction was completed. Using XML to define these attributes facilitates extending the system i.e., the SBO's Web site, to be aware of the number of return visits by the customer without requiring the SBO to have an understanding of or having to modify the underlying storage structures or dependencies. Over time, the XML definition for such a "customer relationship" object may expand to cover all aspects of the history of transactions between the business and the customer. By virtue of XML, the original specification describing when the customer first visited the Web site remains unchanged while whole new subcategories of information have been added to the object. The overall model has added no new rules to support the new data, nor has the underlying data layer and storage system changed to support the potentially vast data contained by the system.

Figure 5:
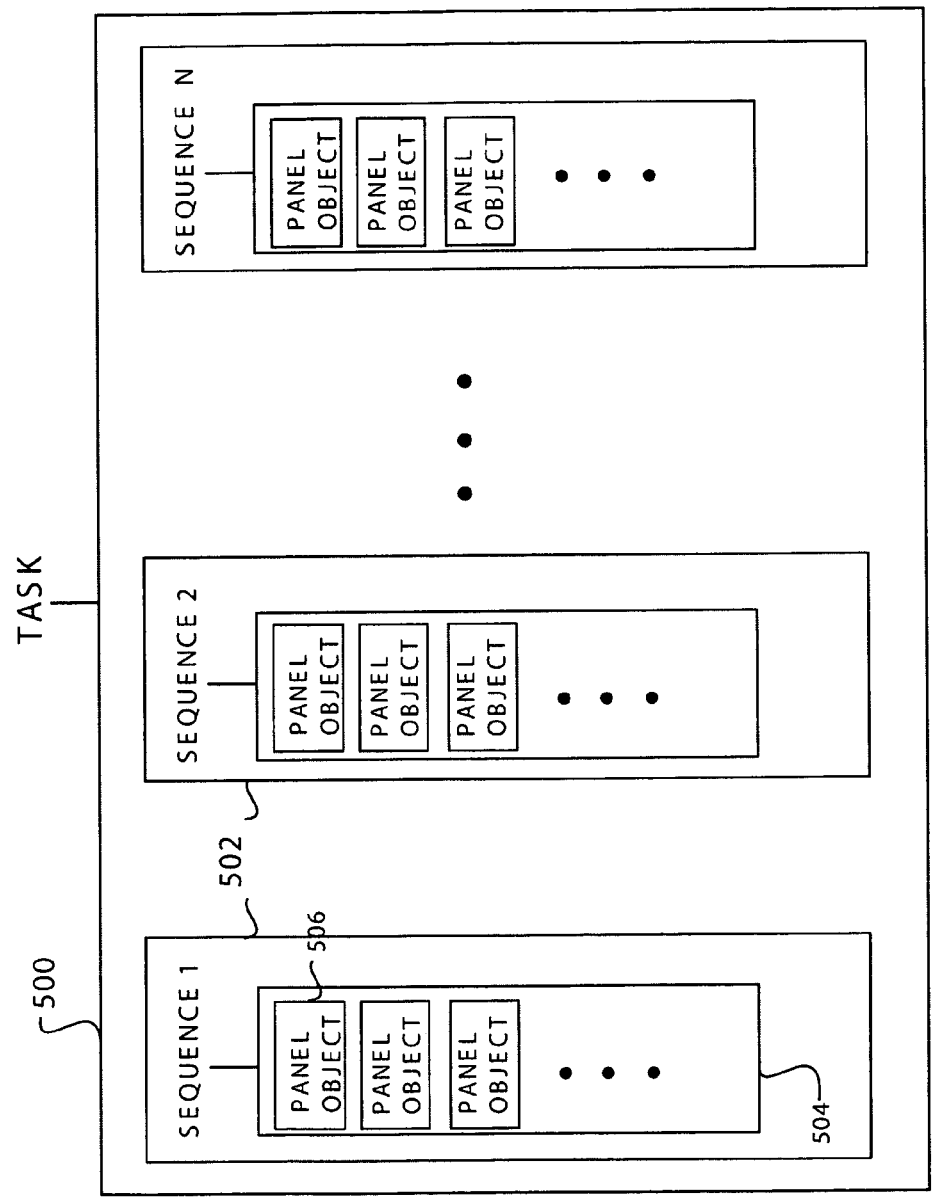
FIG. 5 is a block diagram showing a relationship among tasks, sequences, and panels.

FIG. 5 is a block diagram showing a relationship among tasks, sequences, and panels. A task 500 is a goal-based activity or operation that a user performs in the application-building process. One example is creating a home page in the case of building an e-commerce Web site. Another example is creating an ad banner, generating a list of potential consumers, and enabling the ad banner to be presented to the potential consumers in a consumer marketing campaign application. Tasks are managed by a task viewer in task viewer application layer 208 of FIG. 2 and further described in FIG. 6. Task 500 is made up of one or more sequences 502, where a sequence is geared towards completing a more granular operation within the task, such as selecting an overall layout of a home page. The number of sequences in a task can vary over time, as can the number of tasks in the application-building process. A sequence, in turn, is made up of a series of panel objects 504. It is at the panel level where the user typically creates or edits data. Examples of this are shown in FIGS. 9 to 12.

Each panel object 506 represents an atomic step in task 500. Panels 504 do this by creating form elements that enable windows for data to be entered, displayed, or edited. A form element is an HTML construct that defines the fields that will be sent to a server when a user clicks a SUBMIT button. A panel object 506 is responsible for knowing where to go in the data objects to get its default data. This default data is used for describing the requirements for valid edits of the data and for describing where in the system to store valid results. Panel object 506 can describe valid inputs for each of their form elements or windows. Validation methods are used to determine if a panel object's contents meet the criteria for storage in one or more data objects. The task viewer manages validation by refusing to advance past panels that do not meet the panel object's validation criteria.

Figure 9A:
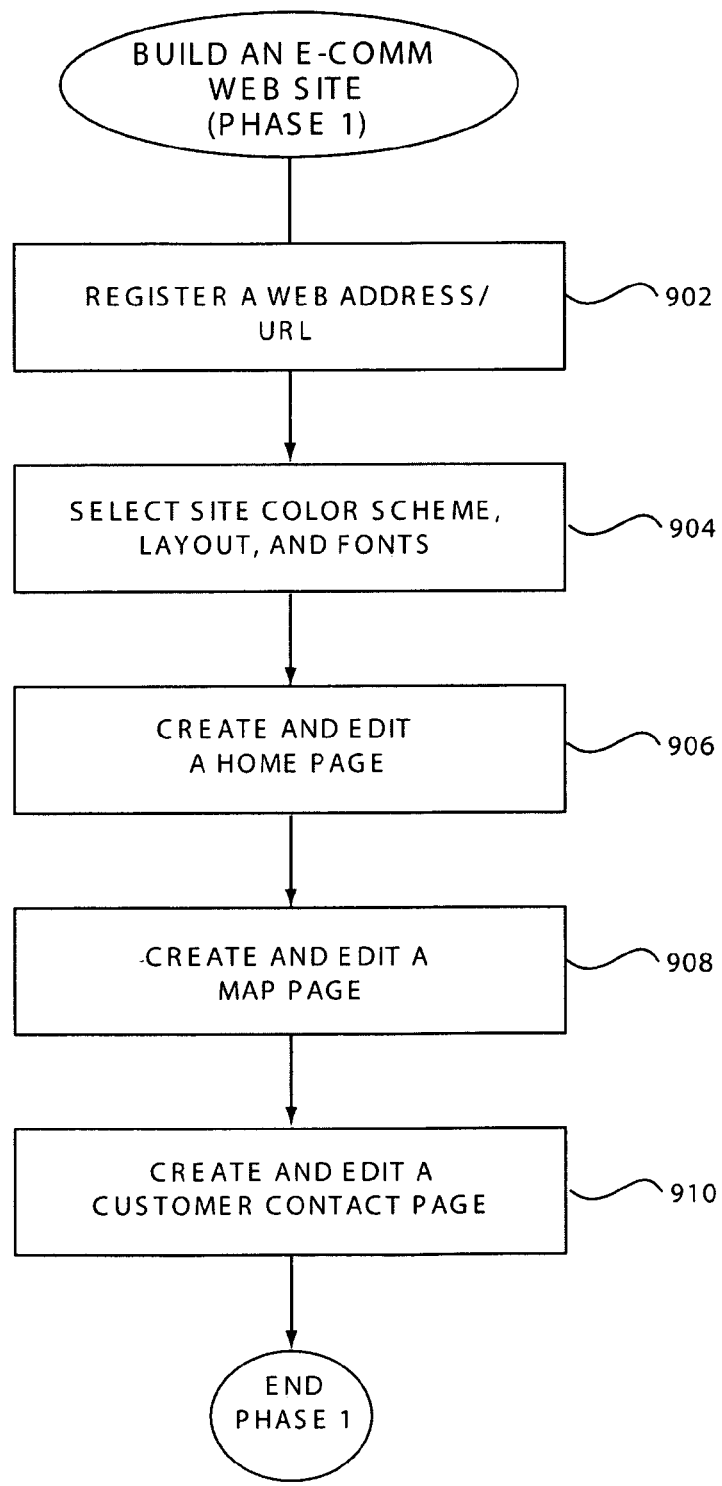
FIGS. 9A, 9B, and 9C are flow diagrams illustrating a task-based approach to building a particular application, namely, an e-commerce Web site, in accordance with one embodiment of the present invention.
Figure 9B:
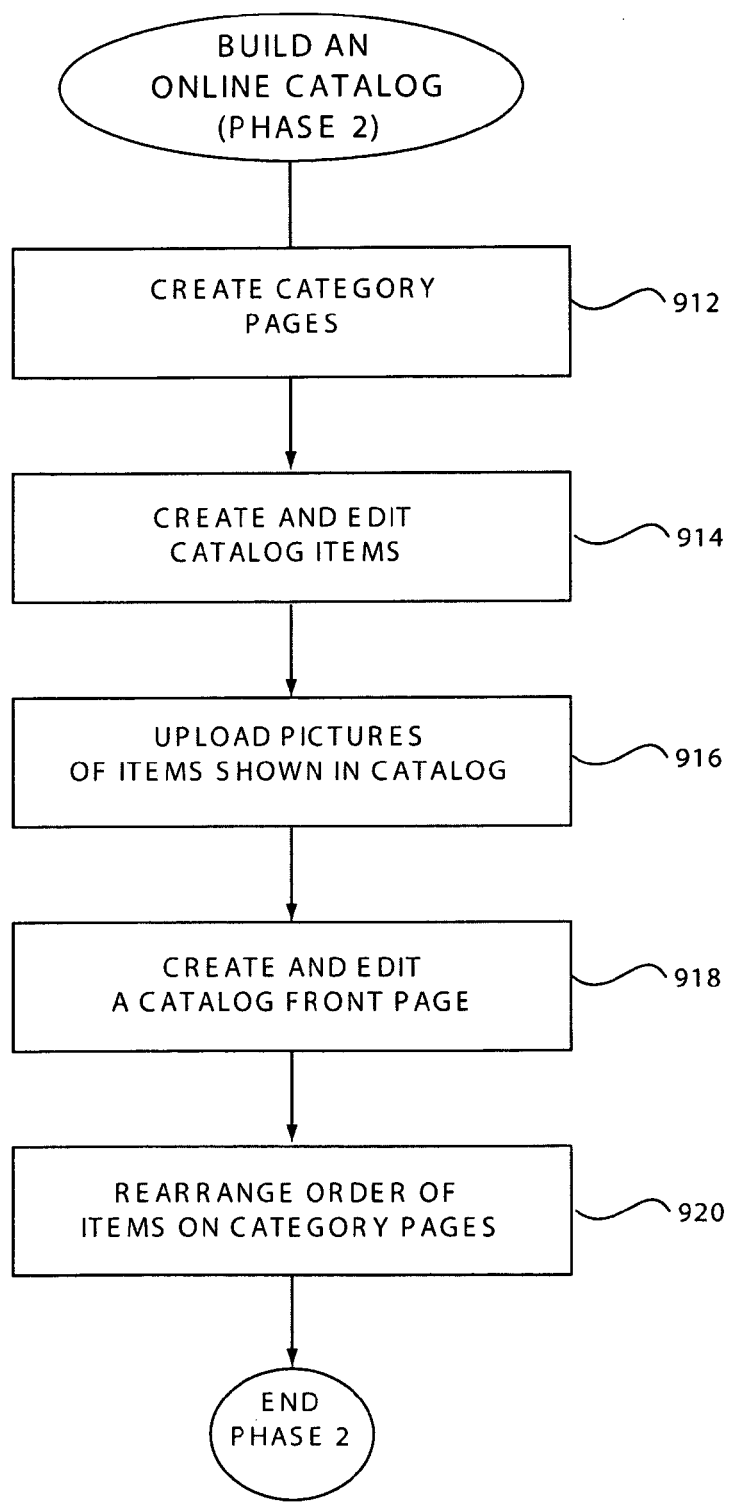
Figure 9C:
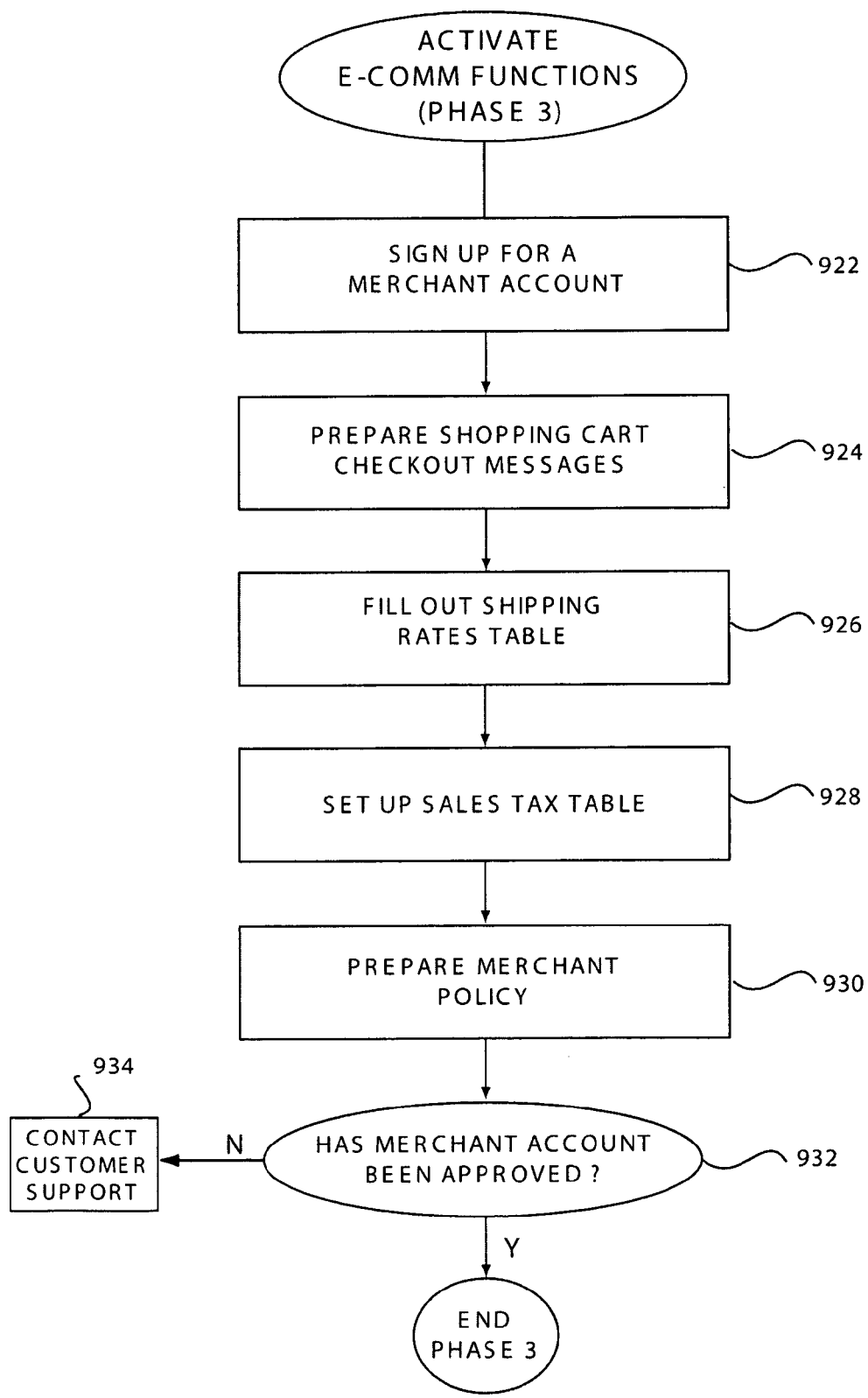

The user experience of the application-building process of the present invention is based on a task-by-task approach. In this model, users complete tasks (self-guided, goal-based operations) to build and manage various parts of their application, such as an e-commerce Web site, including the creation of Web pages, management of a potentially complex Web site, construction of online catalogs, online order processing functionality, and e-commerce merchant functions. The architecture is designed to have discrete layers of functionality, building up from discrete actions or panels to combinations of panels to form sequences which, in turn, form tasks. Discrete actions, such as filling out a form field or clicking a button, are combined together to make a task such as building a Web page. Discrete tasks combine together to form an activity, such as creating and managing an online catalog. An example of a task-based approach to building an application is shown in FIGS. 9A, 9B, and 9C.

Figure 6:
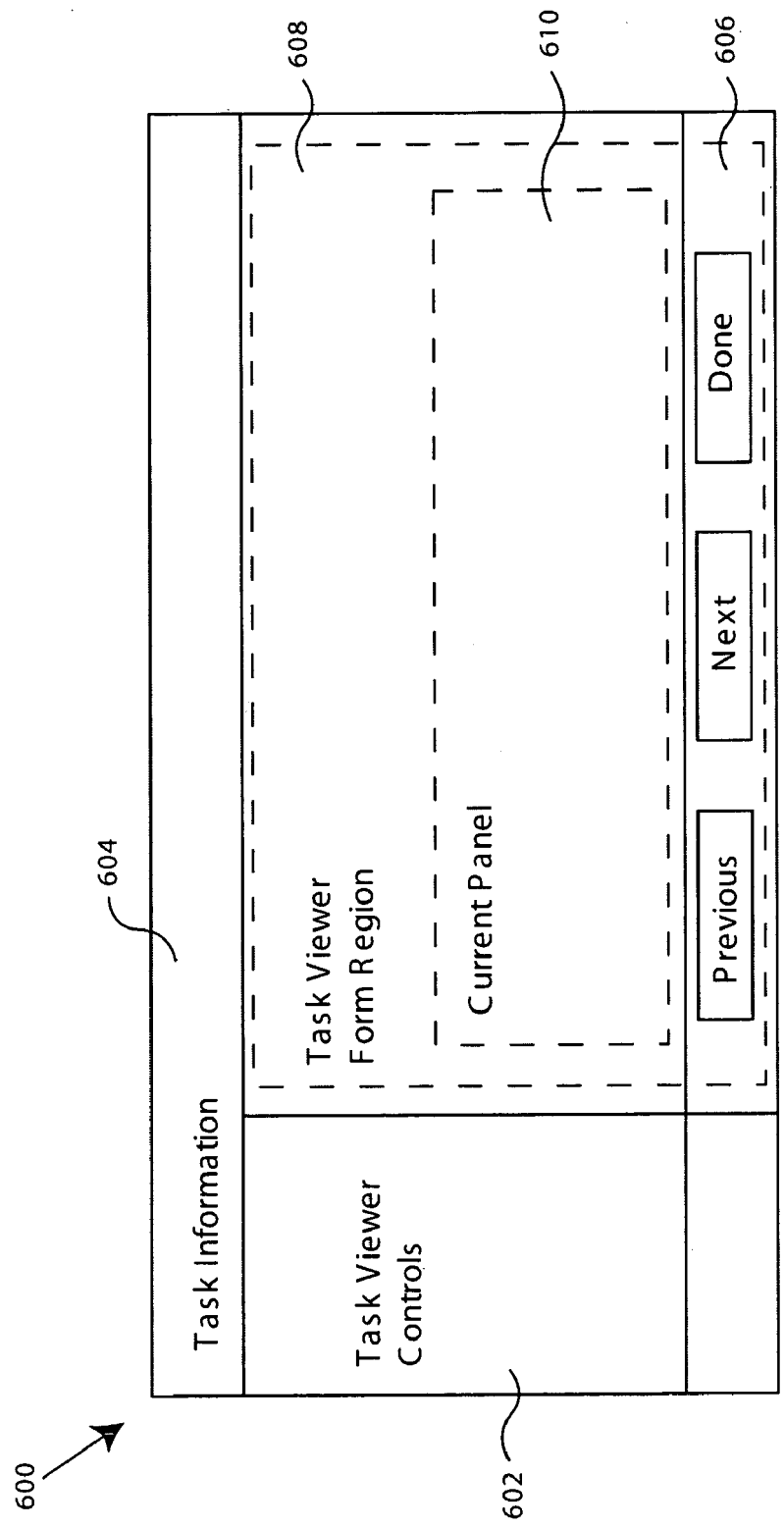
FIG. 6 is a screen illustration showing components of a task viewer application in accordance with one embodiment of the present invention.

FIG. 6 is a screen illustration showing components of a task viewer application in accordance with one embodiment of the present invention. A task viewer application 600 is implemented as a collection of JHTML (Java™ HTML) files. Task viewer 600, as displayed in a user interface, has numerous sections: a controls area 602 for the application; a current task information area 604; navigation elements 606; a configurable HTML form region 608 which allows submitting/viewing information; and a content region 610 acting as a placeholder for contents for a current panel object.

Figure 7:
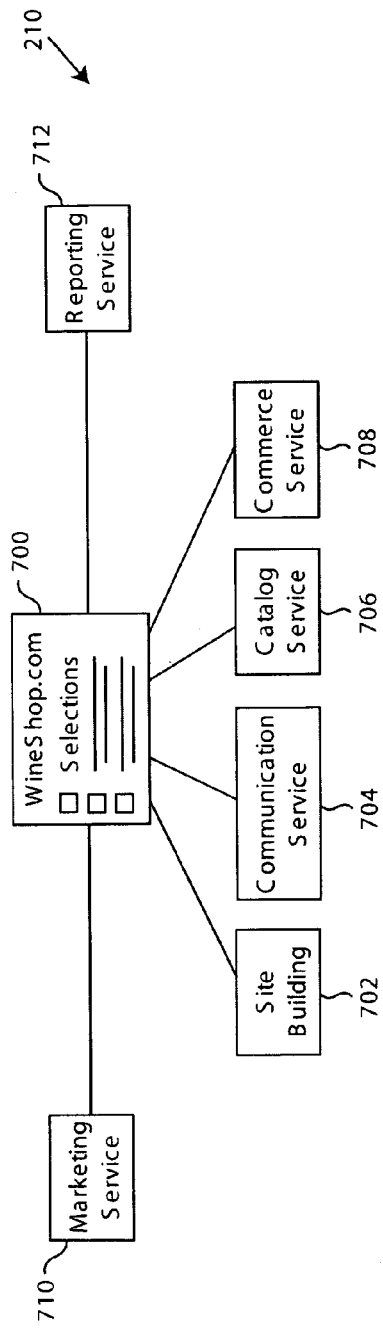
FIG. 7 is a block diagram showing various services used for creating and maintaining a commercial online presence in accordance with one embodiment of the present invention.

FIG. 7 is a block diagram showing various services used for creating and maintaining a commercial online presence 700 in accordance with one embodiment of the present invention. A site building service 702 allows a user to build and maintain Web pages in a step-by-step manner in which discrete tasks are completed. This service gives the user control over the site's appearance and content, and allows the user to make changes to the Web site at anytime. This is enabled in large part by data model 202. A communication service 704 facilitates communicating with online users viewing the online merchant's site through such services as personalized email newsletters and online surveys. Communication service 704 can also facilitate building a customer database storing customer buying patterns and personal preferences, all of which can improve communication between the online merchant and visitors to the site.

A catalog service 706 allows a user to display products or services through an online catalog or portfolio. The user can dynamically change the format, style, and information. Given that an online e-commerce site is being created, a merchant account and an online transaction system needs to be in place. This can be done using a commerce service 708. This service allows users to manage online orders and establish an efficient checkout process, if needed. A marketing service 710 lets the user promote the online business using various marketing tools. For example, marketing service 710 facilitates submitting the site to search engines. As with the communication service, the marketing service takes advantage of email newsletters and surveys, as well as banner advertising. A reporting service 712 allows the SBO to create sales and customer profile reports. Such reports can also include statistics about Web site activity and trends in visitor traffic.

Figure 8:
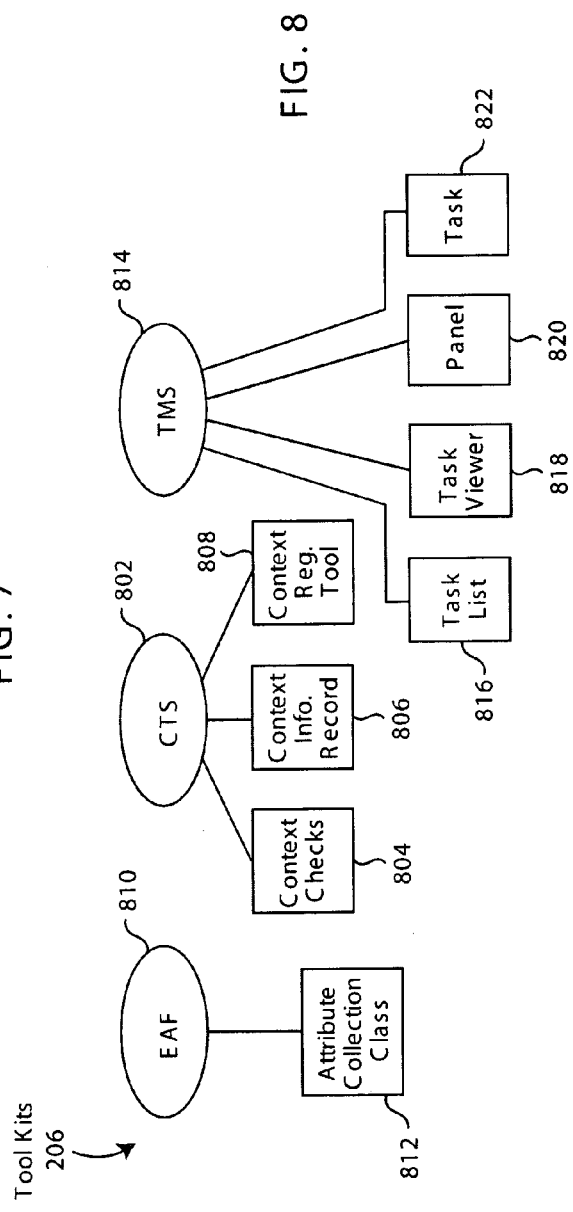
FIG. 8 is a block diagram showing various tools for use in an application-development system in accordance with one embodiment of the present invention.

FIG. 8 is a block diagram showing various tools for use in an application-development system in accordance with one embodiment of the present invention. It describes in greater detail toolkit layer 204 and toolkits 206 of FIG. 2 describing the task-based architecture of the present invention. In the described embodiment, a contextual template system (CTS) tool or context manager 802 used to filter all derived objects based on a current user state. CTS implements a registry of extensible context checks and uses them to maintain a polled snapshot of the current operating environment. This context signature is used to retrieve certain records (e.g., Task, Help, and Renderer records) from the database, and exclude or prioritize them based on their self-described contextual requirements. The CTS or context manager is a runtime object that is responsible for maintaining the context signature for a current user, and is used by other objects to retrieve a list of relevant objects.

In the described embodiment, there are three components in CTS 802. Collectively, they are responsible for the management of contextual information in the system. A context check component 804 is used by context manager 802 to assess and maintain the context signature. Context check module 804 is a module of code which produces a Boolean result. Context checks are written to allow for filtering of a particular rule. An example of this might be a check that is written to determine if the current user is "owned" by a specific partner of the service provider. Certain Renderers (e.g. page layouts) might only be allowed for this specific partner, in which case the task would specify a "Requires" context check for that specific aggregator. In this context a partner is a third-party that has co-branded the service provider's interface and offers it to their users. Such partners may wish to add or subtract various functionality within the application-building process. In another example, a user can be in a basic or advanced mode within a task or the user may be in a create sequence or an edit sequence. For many tasks, users are walked through a create sequence to set a Web page or create their customer database. After this, the user can access data that they have created within edit mode or sequence thereby avoiding having to walk through all the steps again.

Another component is a context information record 806. All contextual objects include a context information record. In the described embodiment, context information records have three sections: Requires, ExcludeIf, and MandatoryIf. Each of these categories is expressed in record 806 as a list of context check IDs and the desired value for the condition to be true. In a natural language example, a task might express itself as follows: I Require that the user has already built a site, but I should be ExcludedIf the customer has already added a map to their site.

Context Check module 804 is programmed using any Java™ development environment. The resulting class file is registered with a name and ID using a content registration tool 808. This tool is able to list context check modules by name when Tasks and Renderers are being registered.

Context Checks are stored in the database and registered when CTS 802 is constructed. CTS 802 manages a runtime instance of each context check. At pre-determined times the CTS polls each of the checks to produce a current signature. When asked for a list of contextual objects, the CTS uses the current signature to filter and sort the results of the database query, resulting in a qualified list of Tasks or Renderers.

An Extended Attribute Framework (EAF) 810 is a tool by which data object attributes are defined, manipulated, and extracted from data schema 102. This attribute framework is extended by all classes in the system which support attributes. Framework 810 provides interfaces and methods which need to be implemented by the extending classes. The attributes themselves, for each instance of a class extending EAF 810, are persistent and present in the database.

In the described embodiment, EAF 810 consists of an "attributecollection" class 812 which consists of attribute manipulation methods. The manipulation of attributes includes methods to add, remove, replace and get attributes. EAF 810 implements an indexed hierarchical collection of attributes. Each attribute has associated with it a name, type and index within the collection.

Another tool is a task management system ("TMS") 814 system which is used to deliver a task-based interface. Task management system 814 encapsulates the design and storage of task sequences 502, their related panel objects 504, their in-memory representation, and their interaction with task viewer application 600. Task manager 814 consists of four components that collectively manage the design, delivery, and storage of task information.

A task list component 816 is a persistent object with two primary purposes. First, it maintains a list of tasks that customers have specified an interest in starting at a deferred time. Second, task list component 816 is used to determine a context-sensitive suggestion of tasks that the current customer might want to pursue.

Task viewer component 818 defines a user interface shown generally in FIG. 6. It is a JHTML based application that interacts with the run-time object representing a currently active task. Task viewer 818 includes a collection of navigation controls (e.g., next, previous, and special), a title area, a content region which contains the current panel in the sequence (containing form/data entry fields), and a collection of task management widgets such as Save buttons. Task viewer application 818 queries the current task to determine the next panel to display, the appropriateness of specific navigation elements, the title to display, and other information relevant to the accomplishment of the task. As such, the in-memory representation of a task object is a model which is manipulated by task viewer 818 acting as controller.

A task 822 is a read-only persistent object that encapsulates visible aspects of a task, contextual information for determining the task's relevance under dynamic conditions, and the sequence logic required for its delivery. In the database, tasks are delivered as an attribute list with high-level accessors available for common functions. As described above, a panel 820 is an atomic element of a sequence that is used to perform a specific step in a task. Panels are registered in the system to provide for reference counting of the sequences that contain them, and the management of their assets.

Task viewer application 818 is launched in response to a request to perform a task. A task 822 is either user-added or dynamically added to task list 816. When a task is started a TSPTask object is added to a current session object. The TSPTask acts as the intermediary for identifying how task viewer 818 should respond to user interaction events.

FIGS. 9A, 9B, and 9C are flow diagrams illustrating a task-based approach to building a particular application, namely, an e-commerce Web site, in accordance with one embodiment of the present invention. The process of building such an application is shown in three sample phases. Phase 1, illustrated in FIG. 9A, shows generic tasks for developing an e-commerce Web site. Phase 2, illustrated in FIG. 9B, shows sample tasks needed for building an online catalog to be used in the Web site and Phase 3, illustrated in FIG. 9C, shows sample tasks for activating e-commerce functions. At step 902 a user, such as an SBO, takes on the first task of registering a domain name. In the described embodiment, a user can either register their existing Web address (e.g., my-store.com) or register a domain name with the application-building service provider, in which case the address would resemble my-store.service-provider.com. In the later case, the service provider verifies that the name for "my-store" is available and verifies basic business information such as address and other user contact information, including the user's email address. At this stage the user also creates a password for his account. It should be noted that the entire application-building process requires that the user only register once with the service provider. The user does not have to re-register or register multiple times with different application tools when beginning work on a different aspect or feature of the application.

At step 904 the user performs the task of determining the general design and look of the Web site by selecting, for example, a color scheme, design layout, and character fonts of the site. In the described embodiment, the display aspect of the site is separated from the content. In this task, the display aspect is being determined. By doing so, the user is settling on a consistent look and appearance for the site. In the described embodiment, this is done by offering the user a number of options or templates for layout designs and color schemes. Each template is a set of HTML objects and graphic templates, and is coded to contain, for example, predetermined fonts, foreground and background colors, and other graphical features. By choosing a template the system can dynamically populate the display.

Once the user has completed this task, at step 906 she creates and edits a top-level page or home page. Typically, a home page introduces a consumer to the user's business and may describe generally the goods or services being offered. The home page is typically updated frequently by the user to reflect, for example, changes in the user's business (i.e., new products or services) or contact information. At step 908 the user completes the task of creating and editing a map page. The various panels, or steps, for completing this task are described in greater detail in FIG. 10. At step 910 the user creates and edits a customer contact page which essentially displays more detailed information about contacting the user, which can be useful if the user is a large, nation-wide business with many locations and departments. These last two tasks are only two illustrative examples of pages that the user can create for the Web site. In the described example, templates are provided to the user to easily create and edit these pages. Some of these templates are shown in FIGS. 11A, 11B, and 11C for creating and editing a map page. Numerous other templated pages can be offered to a user: an "About Us" page, a "Business Relationships" page, a "Job Listings" page, "Frequently Asked Questions," "Employee Bios," and so on. Also in the described embodiment, the user can create any number of customized Web pages for displaying information that suits the user's particular needs.

Steps 902 to 910 illustrate five examples of tasks for creating a basic commercially viable Web site which, in turn, is one example of a multiuser application. In other embodiments, numerous other types of tasks may be more appropriate for a particular application or for the site-building application. As mentioned above, these tasks can be grouped together as phase 1 of the application-building process. It should also be noted that these tasks and the ones following are presented to the user in a consistent manner. The more tasks the user completes, the more comfortable and efficient the user becomes with the process, which does not change significantly as the user advances in the process. This enhances the overall user experience in using the application-building process of the present invention.

FIG. 9B illustrates an example of a second phase of the process. Here the tasks are oriented towards a more specific aspect of the Web site-building application. The example described is building an online catalog for the user's business. Most SBOs, for example, will want to display to consumers a catalog or list of goods and services offered along with photos, descriptions, prices, and so on. At step 912 the user creates category pages. This task is useful for categorizing and distinguishing the user's various goods and services. For example, if the user is an SBO in the retail wine business, there could be a category page for Reds, Whites, Dessert, and so on, and additional category pages within each category.

The next described task is creating and editing items to be listed in the catalog, as shown in step 914. At step 916 the user can upload photos or pictures of the items shown in the online catalog. At step 918 the user creates and edits a front page for the catalog that can, for example, generally describe to consumers the various categories of goods or services being offered. Another possible task involved in building an online catalog is rearranging the order of items on the category pages at step 920. This completes one example of a phase 2 series of tasks for completing another aspect of a Web-site application building process.

FIG. 9C describes yet another series of tasks for developing a commercially viable Web site. It describes tasks for activating certain e-commerce functions normally needed by businesses for accepting and processing actual orders online in which consumers can make payments, for example, with a credit card and have payments go directly to a merchant account. At step 922 the user applies for an online merchant account for accepting payments from consumers. The service provider has an API to a third-party partner specializing in merchant banking and related online shopping cart services. As part of this task, the user completes an online form as required by the third-party, and the service provider then submits this to the third-party. In another preferred embodiment, the user can open an online merchant account prior to beginning the application-building process and enter the existing information, such as bank name, account number, in place of performing this task (entering such existing information would itself be considered a task).

At step 924 the user prepares a series of shopping cart checkout messages. These are messages displayed to a consumer during the whole process of making a purchase online. In a typical example, such messages can begin when the consumer first places a first item in his shopping cart and can end with the content of an email to the consumer when the goods are shipped out. The user can choose from standard messages, such as "Thank you for your order . . . " to more customized messages. For example, the user can select whether the confirmation email to the consumer should contain a list of the items purchased or a simpler message. At step 926 the user fills out a shipping rates table to inform consumers of shipping costs and factors effecting such costs such as weight, number of items, etc. Similarly, at step 928 the user sets up a sales tax table.

At step 930 the user prepares a merchant policy stating practices and policies the merchant abides by in processing online transactions. In the described embodiment, the user, if an SBO or other type of merchant, may be required to abide by a set of standards for issues like refunds, shipping, and so on, considered to be good e-business practices. At step 932 it is determined whether the merchant account applied for in step 922 has been approved. If it has not been approved, the user can contact the service provider at step 934. If it has, the described example of activating e-commerce functions is complete and the SBO or online merchant can begin processing online transactions. As with the previous phases, this is just one example of a series of tasks that might be needed for building an e-commerce Web site.

Figure 10:
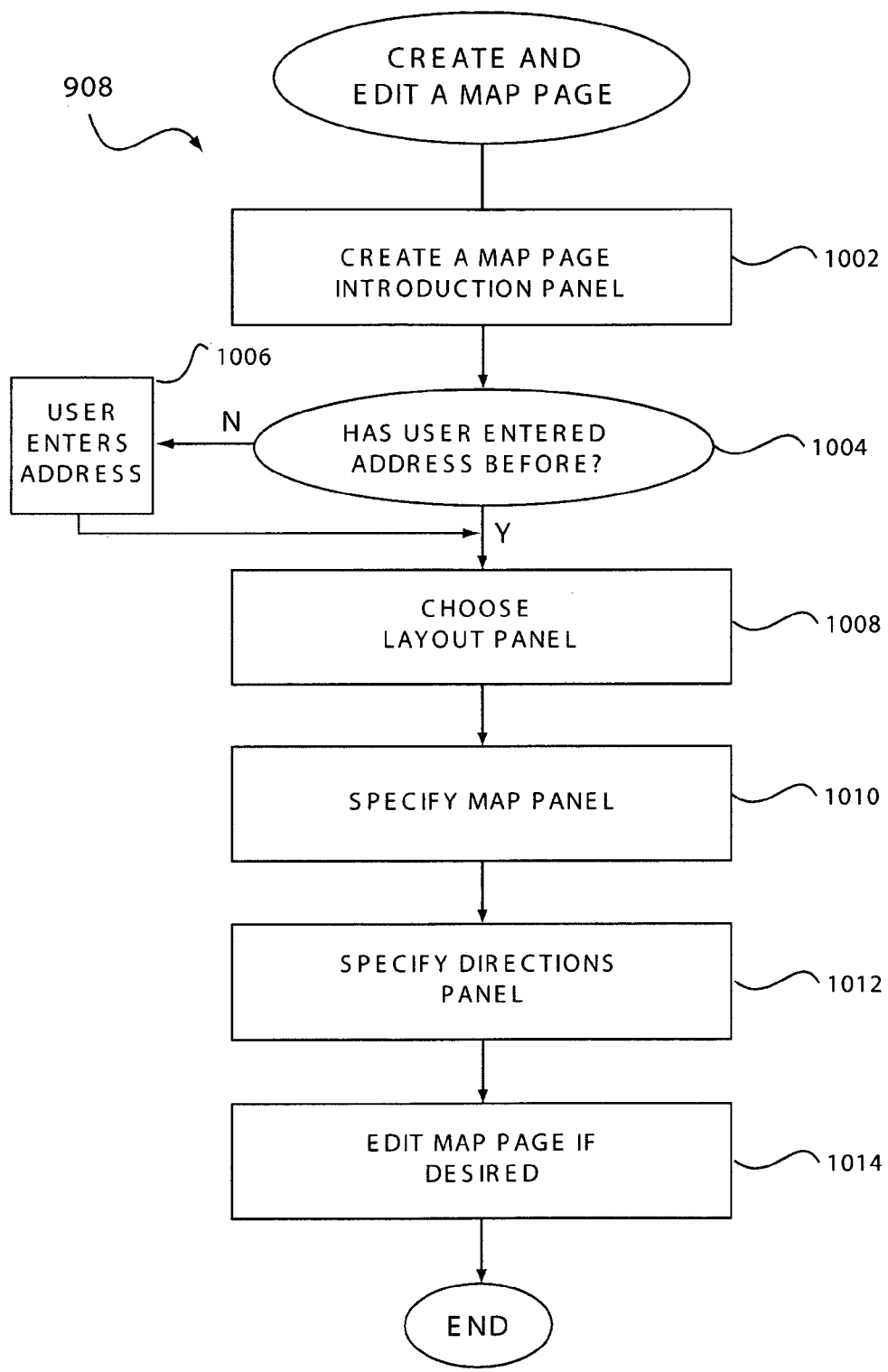
FIG. 10 is a flow diagram of a process of creating and editing a map page in the application building process in accordance with one embodiment of the present invention.
Figure 11A:
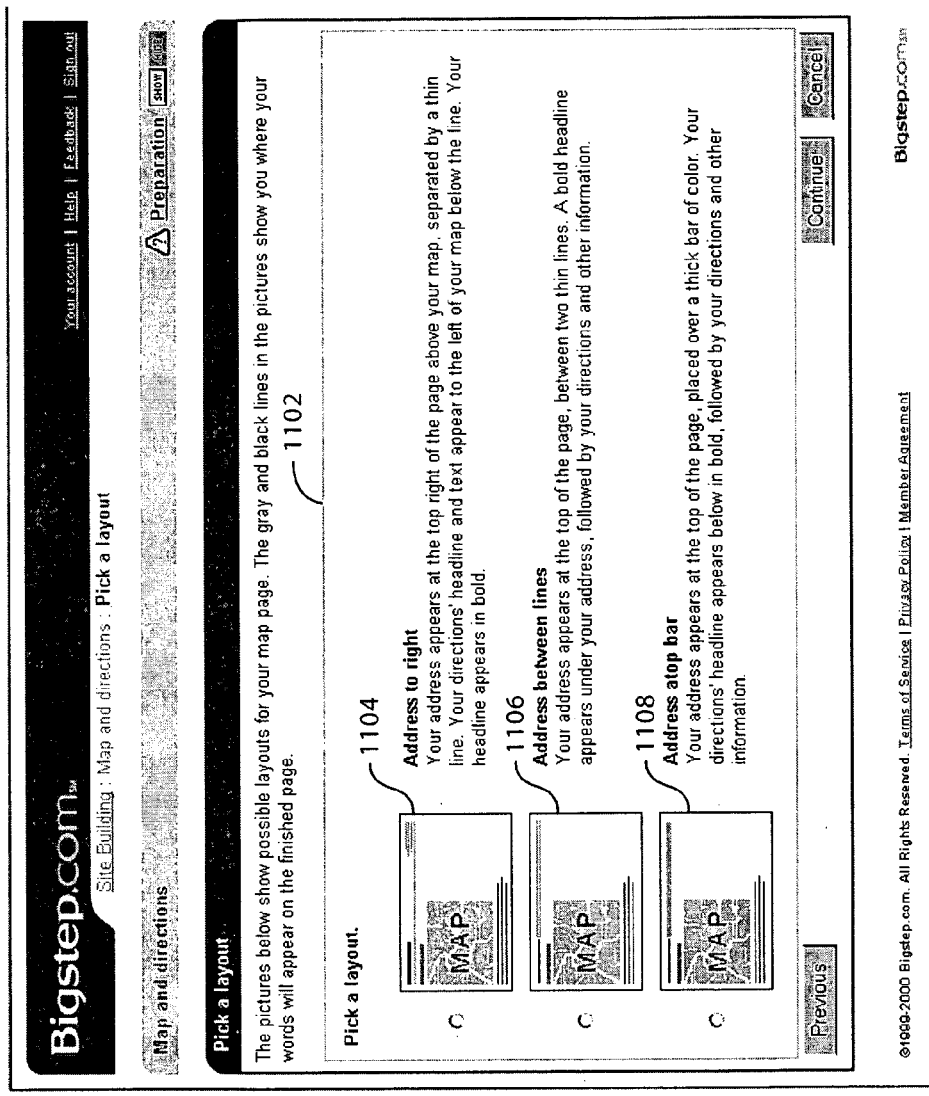
FIG. 11A is a screenshot showing three map page layout options from which a user can choose.
Figure 11B:
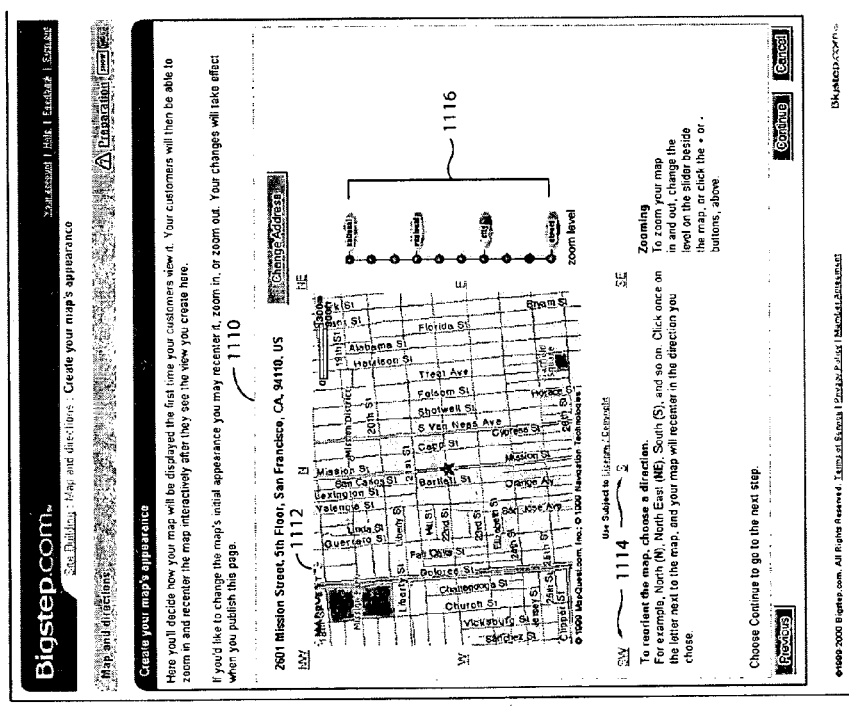
FIG. 11B is a screenshot showing options available to a user for completing a map page layout task.
Figure 11C:
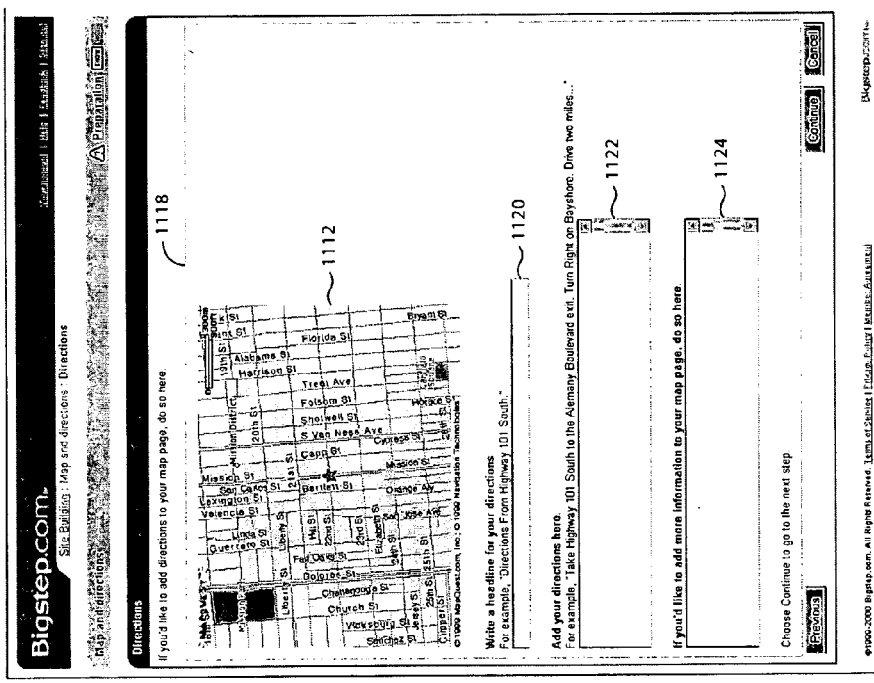
FIG. 11C is a screenshot showing how to complete a user direction layout task.

FIG. 10 is a flow diagram of a process of creating and editing a map page in the application building process in accordance with one embodiment of the present invention. It describes the task shown in step 908 of FIG. 9A. In the site-building application, the user can create a customized, interactive map page for the site. The user's business address is plotted on the map and consumers can zoom in, zoom out, or recenter the map as desired. At step 1002 the user completes a panel for creating an introduction panel for the map page. In the described embodiment, the introduction panel informs consumers of a physical location of the user's business, including directions and other information. At step 1004 it is determined whether the user has previously entered his address. If not, the user does so at step 1006. Once the user's address is entered, the user chooses a layout panel for the map page at step 1006. Here the user can select from several different layouts. FIG. 11A is a screenshot showing three map page layout options from which a user can choose. As shown in panel 1102, the user selects one of three layouts: layout 1104, layout 1106, or layout 1108, as part of completing this particular task.

At step 1010 the user specifies a map panel which determines how the map will be displayed the first time a customer views it. Customers can then interact with the map by zooming in or out or recentering the map. FIG. 11B is a screenshot showing options available to a user for completing this task. In a panel 1110 is an initial map layout 1112. The user can re-orient layout 1112 by selecting one of the direction buttons, such as buttons 1114 for SW and S. The user can select the level of desired detail by using a slider 1116 for zooming in or out.

At step 1012 the user completes a panel for specifying a directions display area. Here a user can provide directions to consumers. FIG. 11C is a screenshot showing how this panel is completed. In a panel 1118 is map layout 1112 and numerous text entry boxes that are self-explanatory. Box 1120 allows a user to enter a headline for the directions, box 1122 allows the user to enter specific directions for consumers, and box 1124 lets the user add any additional information that might be useful to a consumer, such as parking information. At step 1014 the user can edit the map page by bringing up a screen similar to FIG. 11C and editing the text in boxes 1120, 1122, and 1124.

Although the foregoing invention has been described in some detail for purposes of clarity of understanding, it will be apparent that certain changes and modifications may be practiced within the scope of the appended claims. Furthermore, it should be noted that there are alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method of creating a Web site, the method comprising:

invoking a Web site building application program from a site on the Internet by a first user;

creating a Web site data model having a central hub structure containing central hub application data;

creating a plurality of data objects wherein a data object contains fixed Web site building data and extensible Web site building data;

creating a first Web site building model object having a first framework capable of managing tasks, processing said data objects, and being an interface between other model objects and the Web site building application;

creating one or more additional Web site building model objects for containing Web site application data;

combining the first Web site building model object with the one or more additional Web site building model object wherein the first framework of the first Web site building model is unaltered; and enabling the combined first Web site building model object and the one or more additional Web site building model objects to share central hub application data.

2. A method as recited in claim 1 further comprising:

dynamically adding undefined attribute data to the control hub application data.

3. A method as recited in claim 2 further comprising:

dynamically adding undefined attribute data to extensible Web site building data of a data object.

4. A method as recited in claim 1 further comprising:

defining a plurality of Web site building model object categories wherein a category corresponds to a grouping of one or more Web pages on the Web site.

5. A method as recited in claim 1 further comprising:

dynamically configuring the second Web site building model object by adding Web site data.

6. A method as recited in claim 1 further comprising:

sharing Web site application data of the second Web site building model object with a plurality of Web site building applications.

7. A method as recited in claim 1 wherein the first Web site building model object is capable of accepting and verifying a plurality of process data objects.

8. A method as recited in claim 7 further comprising:

accepting and verifying the plurality of process data objects at the first Web site building model object.

9. A method as recited in claim 1 wherein a second user utilizing the Web site building application is able to use an extension attribute or a new attribute defined by the first user.

10. A method is recited in claim 1 further comprising:

accessing the central hub structure using a central hub unique identifier.

11. A computer storage device containing computer-executable instructions for implementing a Web site-building application having an extensible framework, the computer storage device comprising:

a first storage area containing executable instructions for creating a first model object relating to a Web site building application, said first model object capable of managing tasks and performing as a user interface between the Web site building application and a first user, of being a data manipulation logic component, and of being an interface between other model objects and the Web site building application;

a second storage area containing executable instructions for creating a second model object for a Web site building application that can be added to the first model object data model without altering the extensible framework of the Web site building application; and a third storage area containing executable instructions for creating a Web site building application data object containing Web site fixed application data and Web site extensible application data.

12. A storage medium as recited in claim 11 wherein the first storage area is extensible.

13. A storage medium as recited in claim 11 wherein the first model object and the second model object are combined to share central hub application data.

14. A storage medium as recited in claim 11 wherein a fourth storage area containing a plurality of data objects.

15. A storage medium as recited in claim 14 wherein the fourth storage area contains undefined attribute data.

16. A storage medium as recited in claim 14 wherein a data object has a fixed attribute and an extensible attribute.

* * * * *